UNITED STATES PATENT OFFICE.

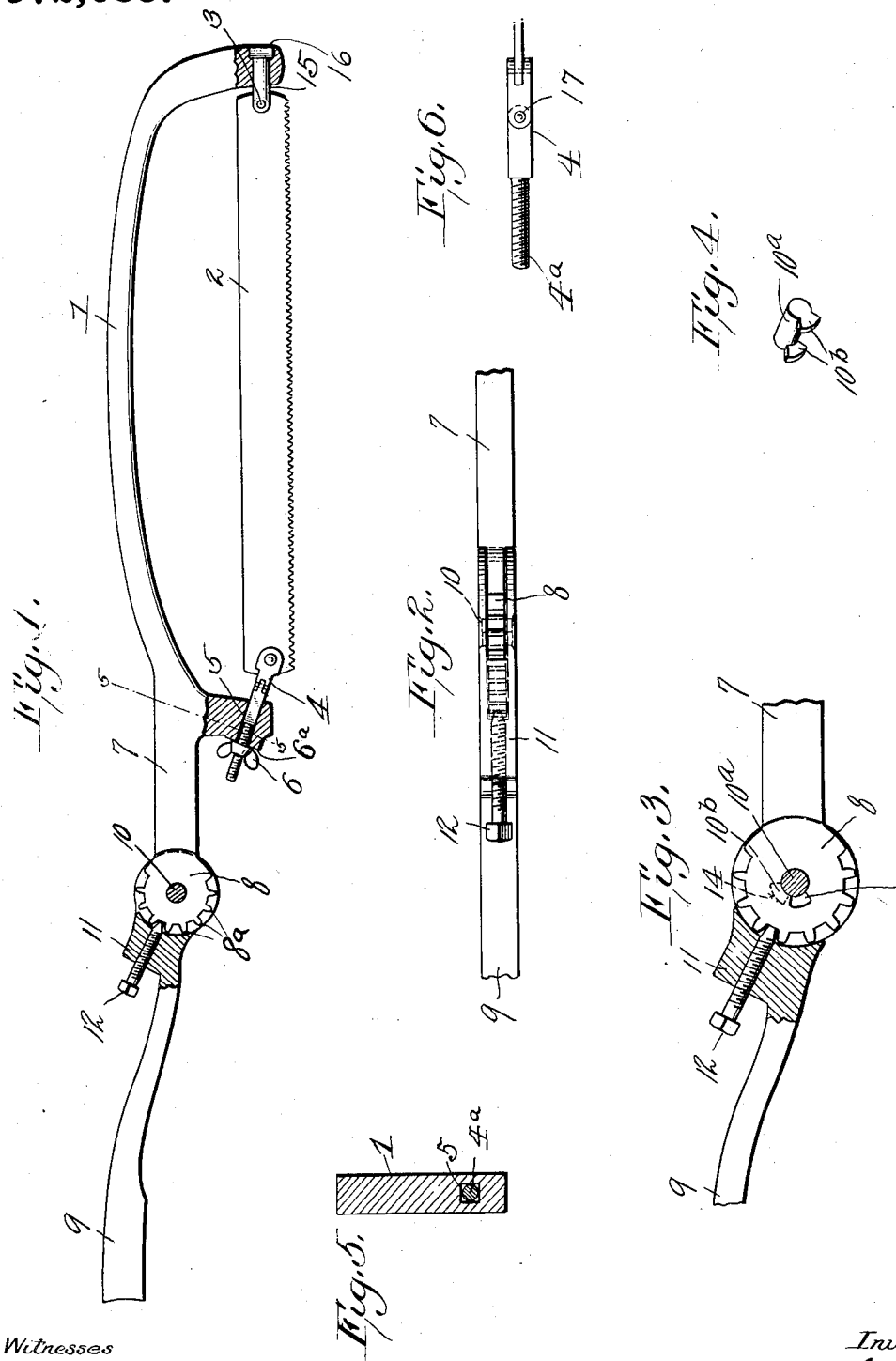

JOHN T. NACEY, OF SUPERIOR, WISCONSIN, ASSIGNOR OF ONE-HALF TO HENRY J. NACEY, OF SUPERIOR, WISCONSIN.

HACKSAW.

972,085.   Specification of Letters Patent.   Patented Oct. 4, 1910.

Application filed November 9, 1909. Serial No. 526,953.

*To all whom it may concern:*

Be it known that I, JOHN T. NACEY, a citizen of the United States, residing at Superior, in the county of Douglas and State of Wisconsin, have invented certain new and useful Improvements in Hacksaws, of which the following is a specification.

The present invention relates to hack saws, and has for its object to provide a saw of this character embodying novel features of construction whereby it can be used to advantage upon work such as would be inaccessible to an ordinary hack saw or a hammer and tool, and which will prove more effective in many instances where a hammer and tool is ordinarily used.

A further object of the invention is the provision of a hack saw which is simple and inexpensive in its construction and which comprises few and durable parts such as will successfully withstand the wear and tear to which hack saws are subject.

With these and other objects in view the invention consists of certain novel combinations and arrangements of the parts as will more fully appear as the description proceeds, the novel features thereof being pointed out in the appended claims.

For a full understanding of the invention, reference is to be had to the following description and accompanying drawing in which:

Figure 1 is a side elevation of a hack saw constructed in accordance with the invention, portions being broken away and shown in section. Fig. 2 is a top plan view of the joint between the handle and the saw frame. Fig. 3 is a side elevation of a modified form of joint, portions being broken away and shown in section, Fig. 4 is a detail perspective view of the pivot pin employed in the modified form of joint. Fig. 5 is a transverse sectional view on the line 5—5 of Fig. 1 and Fig. 6 is an enlarged plan view of the stem to which the inner end of the saw blade is attached.

Corresponding and like parts are referred to in the following description and indicated in all the views of the drawing by the same reference characters.

Specifically describing the present embodiment of the invention, the numeral 1 designates the main frame of the saw which is substantially U shaped and carries the saw blade 2. The outer end of this saw blade 2 is detachably connected by means of a pin or rivet 3 to a stem 15 which has a circular cross section and passes loosely through a corresponding opening in the outer arm of the frame 1, an angular or square head 16 being formed at the extremity of the stem and fitting within a corresponding enlargement at the outer end of the opening through the arm of the frame so as to normally hold the stem against rotation. The inner end of the saw blade 2 is similarly connected to a square stem 4 which passes loosely through an inclined square opening 5 in the inner arm of the main frame 1. The end portion of this square stem 4 is reduced and threaded at 4ª and is engaged by a thumb nut 6 which bears against an inclined shoulder 6ª at the outer end of the opening 5. It will thus be obvious that by tightening or loosening the thumb nut 6 the tension in the saw blade 2 may be increased or decreased in the usual manner as desired, and the particular manner of mounting the stem 4 whereby the same assumes an inclined position has the advantage of throwing the toothed edge of the saw blade out beyond the extremity of the adjacent arm of the main frame 1, and of moving the thumb nut 6 up into an out of the way position. When the saw blade 2 is arranged in the plane of the main frame 1 the various parts are assembled as indicated in Fig. 1, but under some conditions it is found desirable to turn the saw blade through an angle of 90 degrees and lock it in this position at substantially right angles to the plane of the saw frame. In order to accomplish this result, the two stems 4 and 15 are removed from their openings and replaced therein after being turned through the desired angle, the square formation of the stem 4 coöperating with the square opening 5 to lock the said stem 4 against rotation, and the square head 16 of the stem 15 coöperating with the recess in which it fits to lock the said stem 15 against rotation. In this manner the saw blade 2 is held securely in position and may be used in an effective manner. Owing to the inclination of the stem 4, it is necessary to provide the stem with some joint such as indicated at 17, so that when the saw blade is turned into a position at right angles to the main frame the outer end of the stem 4 can turn about the joint 17 and assume a position in the general direction of the saw blade, thereby preventing the flexing of the blade which would otherwise take place.

Projecting from one end of the saw frame 1 is a longitudinally disposed extension 7 the extremity of which is formed with a substantially circular head 8 the periphery of which is formed with the teeth 8ᵃ. A handle 9 has one end thereof bifurcated to receive this head 8 and is pivotally connected thereto by means of the pin 10, such a construction admitting of the handle being swung either up or down into any desirable angle with the main saw frame. A shoulder 11 is provided at the pivot end of this handle 9 and passing through this shoulder is a set screw 12 which is designed to engage the teeth 8ᵃ to lock the handle in an adjusted position. It will thus be obvious that the handle may be held rigidly at any angle to the main saw frame 1 as required by the nature of the particular work to be performed, and that the hack saw may thereby be employed to advantage upon work which would be inaccessible to an ordinary hack saw or a hammer and tool.

A slightly modified form of the invention is shown in Fig. 3, in which the handle 9 is connected to the extension 7 by means of a removable pivot pin 10ᵃ so as to be readily detached therefrom should such become desirable. The pivot opening in the bifurcated end of the handle 9 is formed with the notches 14 while the pivot opening in the head 8 is formed with the notch 13 which is normally out of alinement with the notches 14, and the pivot pin 10ᵃ is provided at its opposite ends with the laterally projecting lugs 10ᵇ. When the handle 9 is swung downwardly into such a position that the notches 13 and 14 register with each other, the pin 10ᵃ may be inserted into position, the lugs 10ᵇ passing freely through the notches. When the handle 9 is then swung upwardly to throw the notches 13 and 14 out of registry, the lugs 10ᵇ project upon opposite sides of the head 8 and hold the pivot pin 10ᵃ securely in position. Owing to the fact that the handle 9 is ordinarily locked in an adjusted position by means of the set screw 12, it is prevented from accidentally turning into such a position as would cause the notches 13 and 14 to register and permit the pivot pin to drop out of position.

Having thus described the invention, what I claim as new and desire to secure by Letters Patent is:

1. In a hack saw, the combination of a saw frame, a saw carried by the saw frame, an extension projecting from the saw frame and terminating in a toothed head having a pivot opening therein, a handle also provided with a pivot opening, a removable pivot pin adapted to be received within the before mentioned openings and constructed to have an interlocking connection with the extension and the handle, and a set screw carried by the handle and engaging the toothed head for locking the handle in an adjusted position.

2. In a hack saw, the combination of a saw frame, a saw carried by the saw frame, an extension projecting from the saw frame and terminating in a toothed head having a pivot opening therein which is in communication with a notch, a handle formed with a bifurcated end embracing the toothed head and provided with pivot openings communicating with notches, the said notches of the handle and head normally being out of registry with each other, a pivot pin adapted to pass through the before mentioned pivot openings and provided at its ends with lugs adapted to pass through the notches when the handle is turned to throw the notches into registry, but engaging the toothed head to hold the pivot pin against displacement when the notches are not in registry, and means for locking the handle in an adjusted position.

In testimony whereof I affix my signature in presence of two witnesses.

JOHN T. NACEY.

Witnesses:
W. E. PICKERING,
L. C. GRAHAM.